Oct. 29, 1929.　　　A. E. HUFF　　　1,733,540
VEHICLE LAMP
Filed Oct. 4, 1924
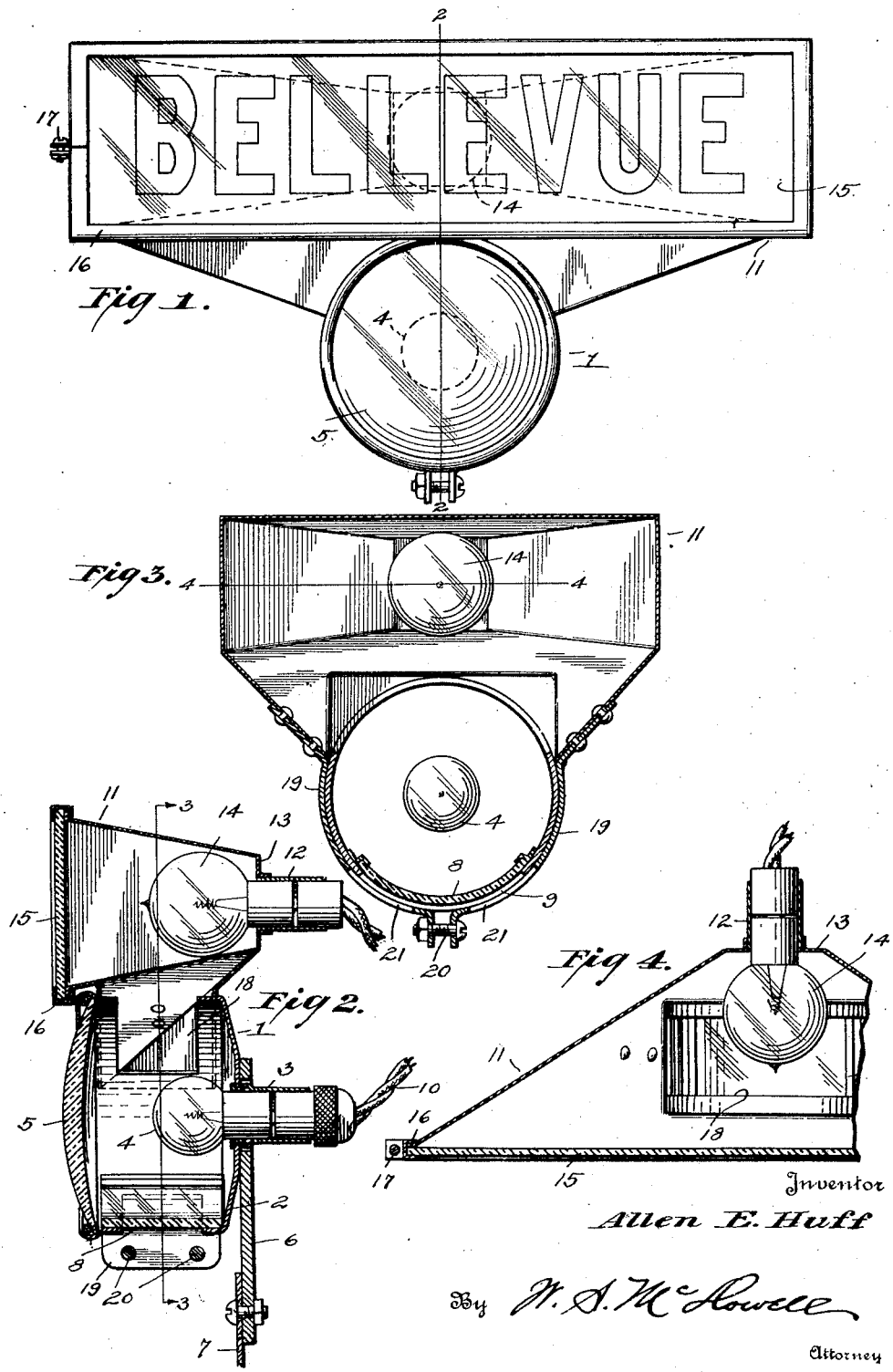

Patented Oct. 29, 1929

1,733,540

UNITED STATES PATENT OFFICE

ALLEN E. HUFF, OF BELLEVUE, OHIO

VEHICLE LAMP

Application filed October 4, 1924. Serial No. 741,635.

This invention relates to improvements in vehicle lamps and has particular reference to an improved combination signal lamp which, when used in connection with motor vehicles, is constructed to provide a tail light and a signal light structure of new and improved design.

Another object of the invention resides in the provision of a motor vehicle light of the aforesaid character in which the incandescent bulb employed in illuminating the tail light lens is also employed to illuminate the transparent plate or lens of the signal light.

A further object resides in the provision of a lamp of the type specified wherein the signal light casing is mounted upon and detachably connected with a casing of the tail light so as to produce a light, compact and economical structure.

A further object of the invention rests in the provision of a vehicle light casing including a transparent plate which may bear the name of the municipality in which the driver of the vehicle resides, the plate being normally illuminated by the bulb of the tail light but being additionally illuminated by a more powerful source of light intermittently upon the operation of the vehicle so that said plate may be employed in the capacity of a signal or stop lamp.

With these and other objects in view, as will appear as the description proceeds, the invention consists in the novel features of construction, combinations of elements and arrangements of parts hereinafter to be fully described and pointed out in the appended claim.

In the accompanying drawings:

Figure 1 is a front elevation of the improved lamp comprising the present invention, Figure 2 is a vertical sectional view taken on the line 2—2 of Figure 1, Figure 3 is a vertical section on the line 3—3 of Figure 2, and Figure 4 is a horizontal sectional view on the line 4—4 of Figure 3.

Referring more particularly to the details of the invention, the numeral 1 designates the round sheet metal casing 1 of a vehicle tail lamp. This casing is provided in its rear wall 2 with the usual auxiliary arranged socket 3 adapted for the reception of the ordinary incandescent lamp 4 of the type used in connection with lights of this character. The open front of the casing 1 is closed as usual by means of the ordinary colored glass lens 5, the rear of the casing is provided with the usual bracket 6 employed to support a license tag or plate 7. The bottom of the casing 1 is provided with a glass plate 8, which covers an opening 9 formed in said casing so as to permit the light of the lamp 4 to illuminate the license tag 7, in the customary manner. Wiring 10 leads to the socket 3 from any suitable source of electrical energy and is governed by the usual switch mechanism (not shown), in automobile construction.

Mounted above the casing 1 is a superposed signal casing 11. Preferably, this casing, when viewed in front elevation, is of rectangular formation. The walls of this casing are preferably formed from sheet metal and are inclined or flared with respect to each other to produce reflecting surfaces upon the interior thereof. These walls converge toward a socket 12 provided centrally and axially in the rear wall 13 of the signal casing, and situated within this socket is an incandescent bulb 14 of relatively increased candle power as regards the lamp 4. The open front of the casing 11 is provided with a glass closure plate 15, upon which may be impressed or designated in any suitable way the name of the municipality in which the driver of the vehicle resides. Of course, other indicia may be employed, such for example, as the name of the manufacturer of the vehicle, or other instructive matter that may be used to indicate the contemplated movements of the driver of the vehicle, such for example as the word Stop, Right, Left, Slow, or the like. The plate 15 is held in place ordinarily by means of a sheet metal band 16, which surrounds the bounding edges of the casing 11 and the plate 15, the band 16 may be tightened in place by means of a screw and nut construction 17.

In order to normally illuminate the plate 15 so that the latter will be visible particularly at night, I form the casing 1 in the upper portion thereof with an opening 18, which establishes communication between the adjoining casings 1 and 11. In this manner the light of the lamp 4, which is normally energized, is permitted to issue into the casing 11, engaging with the reflecting surfaces of the walls of this casing so as to illuminate the plate 15. This renders the plate visible whenever the tail lamp is in use. However, by the use of the added lamp 14, which is of augmented candle power with respect to the lamp 4, and is adapted to be intermittently operated, the degree of illumination of the plate 15 may be changed from time to time. Preferably, the lamp 14 is in a circuit which is closed by the operation of the brake pedal of the motor vehicle, as is customary in lamps of this kind. Therefore when the vehicle operator is about to stop his machine, the bulb 14 will be energized so as to brightly illuminate the plate 15, so that those following the vehicle will be provided with a visual signal of such character as to indicate the operations of the vehicle upon which the lamp is mounted. This construction is economical from a standpoint of current consumption, requiring no more current than is ordinarily used in connection with tail and signal lights of conventional form.

It is of course within the scope of the invention to integrally form the casings 1 and 11. However, for simplicity and economy in manufacture I have found it preferable to detachably mount the signal casing 11 upon the tail light casing 1. This is done by providing the bottom of the casing 11 with flexible metallic bands 19 which surround the lower half of the casing 1 ordinarily through an arc of more than 180 degrees. The bottoms of the bands 19 are downwardly turned and perforated for the reception of binding devices 20, which upon being tightened serve to frictionally draw the bands 19 around the casing 1 and to produce a firm frictional union between the casings 1 and 11, causing the latter to maintain their fixed relative positions during the operation of the vehicle and yet will allow the removal of the casing 11 if such an operation is desired. The bands 19 are of course provided with openings 21 adjacent to the opening in the bottom of the casing 1 so as not to interfere with the casting of light upon the license tag plate 7.

In view of the foregoing description taken in connection with the accompanying sheet of drawing it will be seen that the present invention provides a simple and improved combination light casing for use in motor vehicles especially whereby a signal lens and an indicia bearing plate are illuminated normally by a single incandescent lamp, and wherein the degree of illumination of the indicia bearing plate may be varied from time to time so that the latter may also be employed in the capacity of a signal. The principals are carried out by the provision of simple and readily manufactured apparatus, capable of being economically and readily manufactured.

What is claimed is:

The combination with a cylindrical tail light casing on a motor vehicle wherein said casing has the top portion of the peripheral wall thereof provided with an opening and an internally arranged light source, of a signal light casing arranged above said tail light casing and securely carried by the latter, a light source within said signal casing, said latter casing being shaped to provide flaring side walls and a downwardly inclined bottom wall formed with an opening, said bottom wall being also shaped to conform to the curvature of the tail light casing so as to surround the opening formed in the cylindrical wall of the latter to register said openings.

In testimony whereof I affix my signature.

ALLEN E. HUFF.